US008602386B2

(12) United States Patent
Hornsby et al.

(10) Patent No.: US 8,602,386 B2
(45) Date of Patent: Dec. 10, 2013

(54) VALVE WITH ACTUATOR ASSIST

(75) Inventors: James Russell Hornsby, St. Louis, MO (US); Marcellus Rambo Benson, Chesterfield, MO (US); James Augustus Keefe, III, O'Fallon, MO (US); Joseph Lee McGowan, St. Charles, MO (US)

(73) Assignee: S.C. Johnson & Son, Inc., Racine, WI (US)

( * ) Notice: Subject to any disclaimer, the term of this patent is extended or adjusted under 35 U.S.C. 154(b) by 775 days.

(21) Appl. No.: 11/963,282

(22) Filed: Dec. 21, 2007

(65) Prior Publication Data

US 2009/0159723 A1 Jun. 25, 2009

(51) Int. Cl.
*F16K 15/14* (2006.01)
*F16K 15/18* (2006.01)

(52) U.S. Cl.
USPC ........................................ 251/335.2; 251/331

(58) Field of Classification Search
USPC ........... 239/329, 331–33, 337, 340, 347, 348, 239/463, 464, 469, 471, 526, 527, 239/331–333; 222/372, 382, 383.1, 380, 222/333, 479, 154, 158; 137/625.33, 137/625.28; 251/335.2, 331
See application file for complete search history.

(56) References Cited

U.S. PATENT DOCUMENTS

| | | | | |
|---|---|---|---|---|
| 2,117,747 | A | 5/1938 | Smith et al. | |
| 2,704,690 | A | 3/1955 | Eichenauer | |
| 3,137,326 | A | 6/1964 | Welty et al. | |
| 3,445,068 | A | 5/1969 | Wagner | |
| 3,490,656 | A | 1/1970 | Taschner | |
| 3,667,655 | A | 6/1972 | Knierien, Jr. | |
| 3,904,116 | A | 9/1975 | Jones et al. | |
| 3,967,765 | A | 7/1976 | Micallef | |
| 3,993,250 | A | 11/1976 | Shure | |
| 3,998,736 | A * | 12/1976 | Greenleaf, Jr. | 210/104 |
| 4,020,979 | A | 5/1977 | Shay et al. | |
| 4,153,203 | A | 5/1979 | Tada | |
| 4,154,375 | A | 5/1979 | Bippus | |
| 4,162,037 | A | 7/1979 | Koyama | |

(Continued)

FOREIGN PATENT DOCUMENTS

| | | |
|---|---|---|
| EP | 593900 | 4/1994 |
| EP | 1013345 | 6/2000 |

(Continued)

OTHER PUBLICATIONS http://www.solousa.com, 3 pages, Nov. 2004, "Chemical Applicators: Backpack Sprayers".

(Continued)

*Primary Examiner* — Darren W Gorman

(57) ABSTRACT

A valve having a membrane for controlling flow through the valve, the membrane having open and closed positions. An element urges the membrane to the closed position, and a vacuum pressure at one end of the valve may overcome the urging of the element, thereby moving the membrane to the open position. An actuator is provided for easing or initiating the movement of the membrane. In some embodiments, the valve may take the form of a valve assembly for use in a variety of applications, for example, a valve assembly for relieving a vacuum pressure wherein the assembly includes intake and exhaust ends, a membrane for controlling flow through the assembly, a spring providing a closing bias to the membrane that the vacuum pressure may overcome to move the membrane, and an actuator for initiating the movement of the membrane.

14 Claims, 5 Drawing Sheets

(56) References Cited

U.S. PATENT DOCUMENTS

| | | | |
|---|---|---|---|
| 4,182,465 A | 1/1980 | Bennett | |
| 4,182,496 A | 1/1980 | Burke | |
| 4,187,959 A | 2/1980 | Pelton | |
| 4,189,098 A | 2/1980 | Wagner et al. | |
| 4,204,614 A | 5/1980 | Reeve | |
| 4,234,128 A | 11/1980 | Quinn | |
| 4,239,129 A | 12/1980 | Esposito | |
| 4,260,079 A | 4/1981 | Cary et al. | |
| 4,273,290 A | 6/1981 | Quinn | |
| 4,393,993 A | 7/1983 | Kille et al. | |
| 4,516,695 A | 5/1985 | Garneau | |
| 4,618,099 A | 10/1986 | Nagao et al. | |
| 4,621,770 A | 11/1986 | Sayen | |
| 4,706,888 A | 11/1987 | Dobbs | |
| 4,767,033 A | 8/1988 | Gemperle | |
| 4,830,235 A | 5/1989 | Miller | |
| 4,881,687 A | 11/1989 | Ballu | |
| 4,925,105 A | 5/1990 | Lin | |
| 5,014,884 A | 5/1991 | Wunsch | |
| 5,069,365 A | 12/1991 | Woodhouse | |
| 5,078,188 A | 1/1992 | Nitzberg et al. | |
| 5,147,292 A | 9/1992 | Kullas et al. | |
| 5,150,841 A | 9/1992 | Silvenis et al. | |
| 5,154,317 A | 10/1992 | Roppolo, III | |
| 5,156,304 A | 10/1992 | Battegazzore | |
| 5,184,756 A | 2/1993 | Amron | |
| 5,195,664 A | 3/1993 | Rhea | |
| 5,215,227 A | 6/1993 | Farner | |
| 5,360,153 A | 11/1994 | Cooper | |
| 5,364,111 A | 11/1994 | Wunsch | |
| 5,397,034 A | 3/1995 | Wunsch | |
| 5,427,274 A | 6/1995 | Wood | |
| 5,499,766 A | 3/1996 | Foster et al. | |
| 5,549,249 A | 8/1996 | Foster et al. | |
| 5,590,837 A | 1/1997 | Grogan | |
| 5,605,496 A | 2/1997 | Pickard | |
| 5,657,907 A | 8/1997 | Dobbs et al. | |
| 5,716,007 A | 2/1998 | Nottingham et al. | |
| 5,769,325 A * | 6/1998 | Jouillat et al. | 239/337 |
| 5,878,925 A | 3/1999 | Denkins et al. | |
| 5,964,377 A * | 10/1999 | Demarest et al. | 222/136 |
| 6,022,473 A | 2/2000 | Mickelson | |
| D423,934 S | 5/2000 | Brozell | |
| D442,088 S | 5/2001 | Trepina et al. | |
| 6,227,412 B1 | 5/2001 | Sweeton | |
| 6,260,722 B1 | 7/2001 | Ekkert | |
| D454,778 S | 3/2002 | Siebert et al. | |
| D454,779 S | 3/2002 | Siebert et al. | |
| 6,478,196 B2 | 11/2002 | Fuchs | |
| 6,502,766 B1 | 1/2003 | Streutker et al. | |
| 6,554,211 B1 | 4/2003 | Prueter et al. | |
| 6,595,437 B1 | 7/2003 | Lawson et al. | |
| 6,752,330 B2 * | 6/2004 | DiMaggio et al. | 239/337 |
| D494,866 S | 8/2004 | Guala | |
| D495,399 S | 8/2004 | Guala | |
| 6,796,515 B2 * | 9/2004 | Heren et al. | 239/526 |
| 6,910,605 B2 * | 6/2005 | Schuckmann et al. | 222/383.1 |
| 6,945,438 B1 | 9/2005 | Shih et al. | |
| 7,011,521 B2 | 3/2006 | Sierro et al. | |
| 7,021,399 B2 | 4/2006 | Driessen | |
| 7,097,119 B2 | 8/2006 | Hornsby et al. | |
| 7,246,755 B2 | 7/2007 | Hornsby et al. | |
| 7,328,859 B2 | 2/2008 | Hornsby et al. | |
| 2003/0052194 A1 | 3/2003 | Streutker et al. | |
| 2003/0062503 A1 * | 4/2003 | Newberg | 251/335.2 |
| 2005/0082389 A1 | 4/2005 | Sanchez et al. | |
| 2005/0098577 A1 | 5/2005 | Huy et al. | |
| 2005/0133624 A1 | 6/2005 | Hornsby et al. | |
| 2005/0133627 A1 | 6/2005 | Hornsby et al. | |
| 2005/0189381 A1 | 9/2005 | Tsuchida | |
| 2005/0194467 A1 | 9/2005 | Wanbaugh et al. | |
| 2007/0090321 A1 * | 4/2007 | Bork | 251/335.2 |
| 2007/0228186 A1 | 10/2007 | Hornsby et al. | |
| 2009/0032618 A1 | 2/2009 | Hornsby | |
| 2009/0152486 A1 * | 6/2009 | Bong et al. | 251/129.01 |

FOREIGN PATENT DOCUMENTS

| | | |
|---|---|---|
| EP | 1543884 | 6/2005 |
| JP | 54117608 | 8/1979 |
| WO | 9618572 | 6/1996 |
| WO | 2005060685 | 7/2005 |
| WO | 2006101730 A | 9/2006 |

OTHER PUBLICATIONS

Saint-Gobain Calmar Inc., Copyright 2004, "PS2003 Ready to Use Power Sprayer", 2 pages.

English Translation of JP 54-117608, document date Aug. 17, 1979.

http://www.solousa.com. 1 page, Nov. 2004. "Chemical Applicators: Handheld Sprayers".

PCT/US2008/013825 International Search Report and Written Opinion dated Mar. 24, 2009.

* cited by examiner

VALVE WITH ACTUATOR ASSIST

BACKGROUND

The present disclosure relates to flow controls, valves, and devices for controlling, starting, and stopping a flow, and to methods of making and using such controls, valves, and devices. More particularly, the present disclosure relates to controls, valves, and devices that control, start, and/or stop a flow in one direction and, more particularly, to one-way valves having an actuator assist.

Valves, including one-way valves, are used in many situations and arts to influence, control, or regulate flows of substances. Examples include the refining or chemical processing industries, coating systems or mechanisms, and dispensing systems or mechanisms, such as handheld sprayers, water guns, robotic sprayers, and the like.

No matter what flow, spray system, or flow path a valve may be associated with or used in, the flowing substance to be controlled may include aggressive formulas that leak and/or leave a sticky residue in the interior of a nozzle, dispensing system or sprayer head, and on valve components or surfaces, e.g., the seat, stem, peripheral edge, etc. Valves provided inside a sprayer head, for example, may be used to regulate the flow of air and fluid in the sprayer and prevent leaks. However, such valves may become sticky due to the residues left by the fluids. Thus, the valves may tend to stick open and leak, and/or stick closed and prevent the air or fluid from passing through. The sticky residue may be caused by direct contact between the valves and fluid from a reservoir of the sprayer or by contact with vapors from the fluid in the reservoir.

There is a need in the flow control art for a valve, and in some embodiments a one-way valve, that compensates for and/or reduces the likelihood of leakage, substandard performance, or malfunction. There is a need in the art for a valve having an actuator assist for initiating and/or facilitating the opening of the valve. There is a further need in the art for a dispensing or spray system, sprayer, power sprayer, or the like that maintains a properly pressurized fluid reservoir and a valve that maintains proper operation under use with aggressive formulas.

SUMMARY

In one embodiment, the present disclosure relates to a valve having first and second ends or sides (e.g., an inlet and an outlet side) and a membrane for controlling a flow through the valve between the first and second ends or sides, the membrane having open and closed positions. An element urges the membrane to a closed position, and a vacuum pressure at either the first or second end overcomes the urging of the element, thereby moving the membrane to the open position. An actuator is provided for easing or initiating the movement of the membrane.

The present disclosure, in another embodiment, relates to a one-way valve having an actuator assist for initiating the opening of the one-way valve. The present disclosure, in yet another embodiment, relates to a valve assembly operably coupled to a reservoir, the valve assembly having a generally closed position when the air pressure in the reservoir is substantially ambient air pressure, and the valve assembly has a generally open position when the air pressure in the reservoir is generally lower than ambient pressure allowing air flow into the container.

The present disclosure further relates to a valve assembly for relieving a vacuum pressure. The valve assembly comprises an intake end, an exhaust end, a valve membrane for controlling flow through the valve assembly between the intake end and the exhaust end, a spring member providing a closed bias to the valve membrane that the vacuum pressure may overcome in order to open the valve membrane, and an actuator for initiating the opening of the valve membrane. The valve assembly of the present disclosure is not limited to use with power sprayers and may be used in a variety of applications including, but not limited to, handheld sprayers, water guns or other toys, paint sprayers, or any other environment where relief of a vacuum pressure is desired, including the return of air into a container having a fluid, where dispensing the fluid creates a vacuum.

The present disclosure, in another embodiment, relates to a novel and advantageous powered dispenser that includes means for returning air to the reservoir of the dispenser. A powered dispenser may include a return air valve that may be actuated by the vacuum created in the reservoir. The return air valve may include a lever or tab, etc. that may be used to initiate the opening of the valve, after which the vacuum created in the reservoir may then open the valve and maintain the valve in an open position until the vacuum is minimized or eliminated.

In one embodiment, the dispenser of the present disclosure comprises a motorized liquid spray pump which may be used interchangeably on typical containers or bottles for a variety of substances. A spray pump of the present disclosure may be used for a variety of purposes. For example, in the home, cleaning solutions such as window cleaners may be sprayed or dispensed with it. In the garage, for automotive uses, various cleaning materials may be dispensed or applied using the sprayer of the present disclosure. In the garden, the spray pump may be used for spraying or dispensing insecticides and herbicides or for misting plants. It may be used in a wide variety of applications or uses at home or on the job, anywhere, for example, that hand-pumped sprayers are currently in use. In one embodiment, a spray pump of the present disclosure is designed to fit any standard cleaner bottle, but it may also comprise an empty bottle that the user can fill and use to dispense substances.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

The present disclosure relates to novel and advantageous flow controls, valves, and devices for controlling, starting, and stopping a flow, and to methods of making and using such controls, valves, and devices. More particularly, the present disclosure relates to controls, valves, and devices that control, start, and/or stop a flow in one direction and, more particularly, to one-way valves having an actuator assist. The present disclosure further relates to novel and advantageous dispensing or spray systems, sprayers, power sprayers, handheld sprayers, water guns or other toys, paint sprayers, or the like that include means for returning fluid or air to a reservoir of the device. Particularly, a dispensing device, for example, may include a return air valve that may be actuated by the vacuum created in the reservoir. In a further embodiment, the return air valve may include an actuator, such as a lever, tab, etc., that may be used to initiate the opening of the valve, after which the vacuum created in the reservoir may then open the valve and maintain the valve in an open position until the vacuum is minimized or eliminated. A dispensing device of the present disclosure may further include means for returning air to a reservoir during the removal of fluid from the reservoir or shortly after removal of fluid from the reservoir, such that the air pressure inside the reservoir returns to substantially the ambient air pressure.

Figure 1:
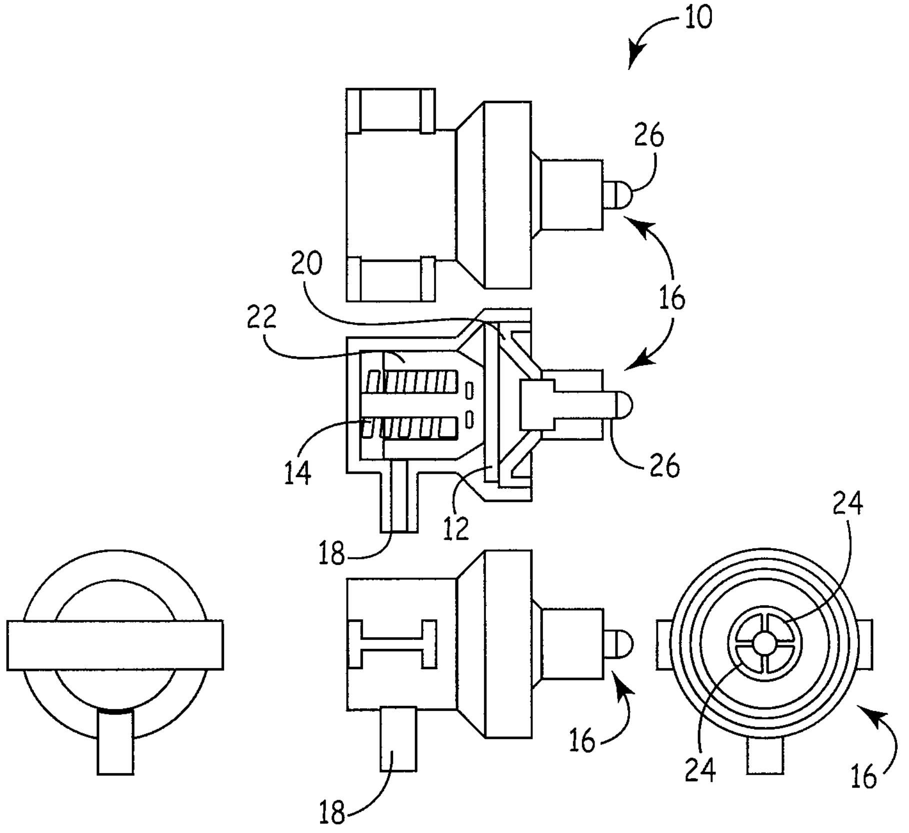
FIG. 1 includes a top, side, front, and back view as well as a side cross-sectional view of a valve assembly in accordance with the present disclosure.

In one embodiment, as illustrated in FIG. 1, a valve 10, or similar device for controlling, starting, and stopping a flow may be or comprise an umbrella-type valve or butterfly-type valve. In some embodiments, the valve 10 may be a unidirectional, or one-way valve, thereby allowing fluid or air flow in a single direction. In further embodiments, the valve 10 may be adapted to be coupled, operably coupled, or otherwise connected to a system having an air or fluid reservoir. The valve 10 may comprise an umbrella membrane or disc 12, a spring or spring-like structure 14, an intake end 16, and an exhaust end 18. The umbrella disc 12 may be generally thin, flat and circular in shape. However, it is recognized that other suitable shapes and thicknesses may be used, such as but not limited to, elliptical. The material from which the umbrella disc 12 may be manufactured can vary depending on the use of the valve 10, dispensing device or system in which the valve 10 is used, and/or fluid that is provided in a reservoir of the dispensing device or system. The umbrella disc 12 may be manufactured from any suitable material, including but not limited to, rubber, plastic or other suitable polymer, etc. The umbrella disc 12 may have a normally closed position, wherein the umbrella disc 12 substantially forms a seal against disc seat 20, thereby preventing air to flow from the intake end 16 to the exhaust end 18.

The spring 14 may provide a bias to the umbrella disc 12 towards a closed position. The valve 10 may further include a support structure 22 between the spring 14 and the umbrella disc 12. The support structure 22 may prevent direct contact between the spring 14 and the umbrella disc 12, thereby preventing damage to the umbrella disc 12 that may be caused by direct contact with the spring 14.

In some embodiments, the valve 10 may be used as an air return valve. The intake end 16 may comprise one or more slots or openings 24 for allowing air to enter the valve 10. The exhaust end 18 may be directly or operably coupled to a reservoir or other source of vacuum pressure.

When the vacuum pressure at the exhaust end 18, or pressure in the reservoir, drops below the ambient pressure by, for example, actuation of the dispensing device or system and removal of air or fluid from the reservoir, the vacuum created at the exhaust end 18 may cause the valve 10 to open. That is, a vacuum created at the exhaust end 18 may cause the umbrella disc 12 to overcome the bias of the spring 14 and support structure 22 and become unseated from the disc seat 20. Thus, the umbrella disc 12 may open, allowing air flow from the intake end 16 to the exhaust end 18, and, in some embodiments, into a reservoir. In one embodiment, the umbrella disc 12 and valve 10 may be configured such that minimal vacuum pressure at the exhaust end 18 can open the umbrella disc 12 or unseat the umbrella disc 12 from the disc seat 20. However, the umbrella disc 12 may also be configured to be strong enough so that, in the closed or seated position, leaks of fluid from the reservoir are not allowed through the valve 10. Once the vacuum pressure at the exhaust end 18, or pressure in the reservoir, reaches substantially ambient pressure, the bias of the spring 14 and support structure 22 may overcome the vacuum created at the exhaust end 18 and the umbrella disc 12 may become reseated on the disc seat 20, thereby preventing air flow from the intake end 16 to the exhaust end 18.

In some cases, fluid in the reservoir may include air fresheners, insecticides, soap scum remover, tile grout cleaner, window cleaner, all purpose cleaner, etc. Therefore, in some cases, the fluid may comprise an aggressive formula that may leave a sticky residue on the umbrella disc 12, thereby causing valve failure or inconsistency in valve operation, etc. and preventing correct air flow into the reservoir. For example, the sticky residue may cause the umbrella disc 12 to stick in an open position and allow leaks and/or stick in a closed position such that fluid or air is prevented from passing through. The sticky residue may be caused, for example, by direct contact between the umbrella disc 12 and fluid from the reservoir that has seeped up into the valve 10 or by contact with vapors from the fluid in the reservoir.

Therefore, in one embodiment, the valve 10 may further include a mechanical actuator, such as a mechanical tab, rod, or lever, etc., that may open or initiate the opening of the valve 10. Once the opening of the valve 10 has been initiated using the mechanical actuator, the vacuum created by the reservoir may maintain the valve 10 in an open position, or continue opening the valve 10, such that air may flow from the intake end 16 to the exhaust end 18. The mechanical actuator, in one embodiment, may be a push rod 26 generally near the intake end 16. The push rod 26 may have a normal position with one end protruding from the intake end 16 of the valve 10. In one embodiment, the push rod 26 may be activated by a trigger of the dispensing device or system. Upon actuation of the trigger, the trigger may abut the protruding end of the push rod 26 and cause the opposite end of the push rod to contact the umbrella disc 12. Contact between the push rod 26 and the umbrella disc 12 may unseat, or initiate the unseating of, the umbrella disc 12 from the disc seat 20. As the trigger may also actuate flow of air or fluid from a reservoir, the resulting vacuum created in the reservoir may cause the umbrella disc 12 to remain unseated or continue to become unseated from the disc seat 20, thereby opening the valve 10. In other embodiments, the vacuum at the exhaust end 18 may be created independently from the mechanism used to actuate the push rod 26. In alternative embodiments, the push rod 26 may be activated by a component other than a trigger, such as but not limited to, a switch, a gear box assembly, etc. In further embodiments, the push rod 26 may be activated by any suitable mechanism in the dispensing device or system, such as any cam or lever assembly from a pump, gear box, motor assembly, etc. of the dispensing device or system.

In one embodiment, the mechanical actuator does not open the valve 10 enough to sufficiently allow air or fluid to flow from the intake end 16 to the exhaust end 18. Rather, the mechanical actuator initiates the opening while the vacuum created in the reservoir may provide the force to sufficiently open the umbrella disc 12. Once the pressure in the reservoir reaches substantially ambient pressure, the bias of the spring 14 and support structure 22 may overcome the vacuum created by the reservoir and the umbrella disc 12 may become reseated on the disc seat 20, thereby preventing flow from the intake end 16 to the exhaust end 18. In alternative embodiments, the mechanical actuator opens the valve 10 enough to sufficiently allow air or fluid to flow from the intake end 16 to the exhaust end 18, and the vacuum created in the reservoir may provide the force to maintain the valve 10 in an open position. Furthermore, the mechanical actuator may be used to unseat the umbrella disc 12 to any suitable extent, such that the vacuum created in the reservoir can maintain the umbrella disc 12 in an open position or continue to open the umbrella disc 12 to a fully opened position. In other embodiments, mechanical actuators other than a push rod may be used, such as a tab or mechanical slider, etc.

Figure 2:
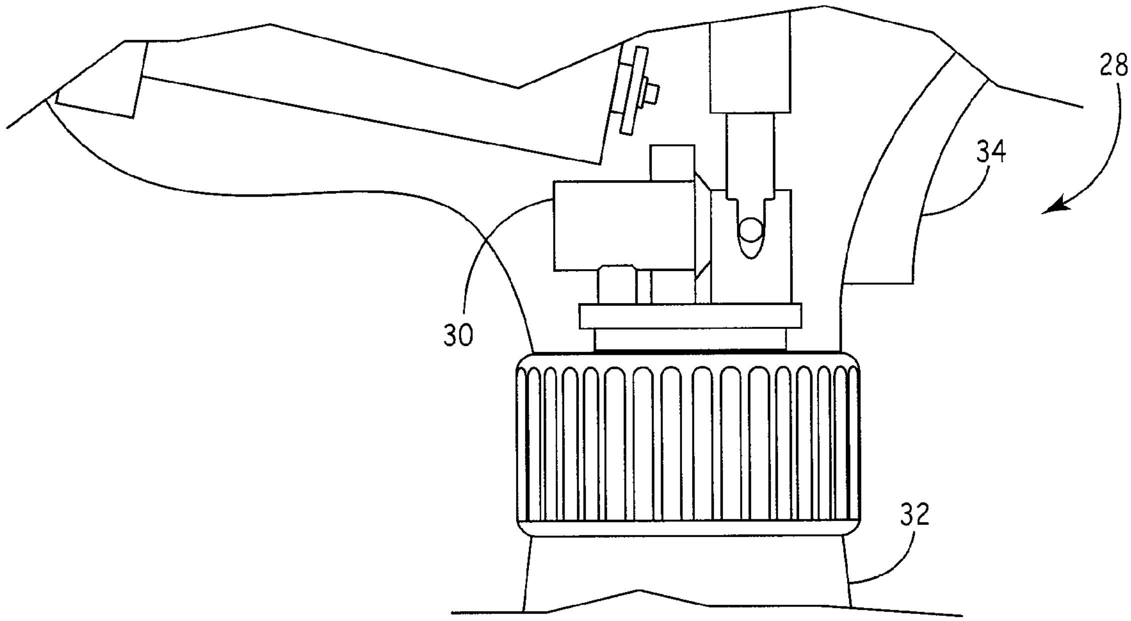
FIG. 2 is a partial side cross-sectional view of an embodiment of a handheld power sprayer having an air flow valve assembly in accordance with the present disclosure.
Figure 3:
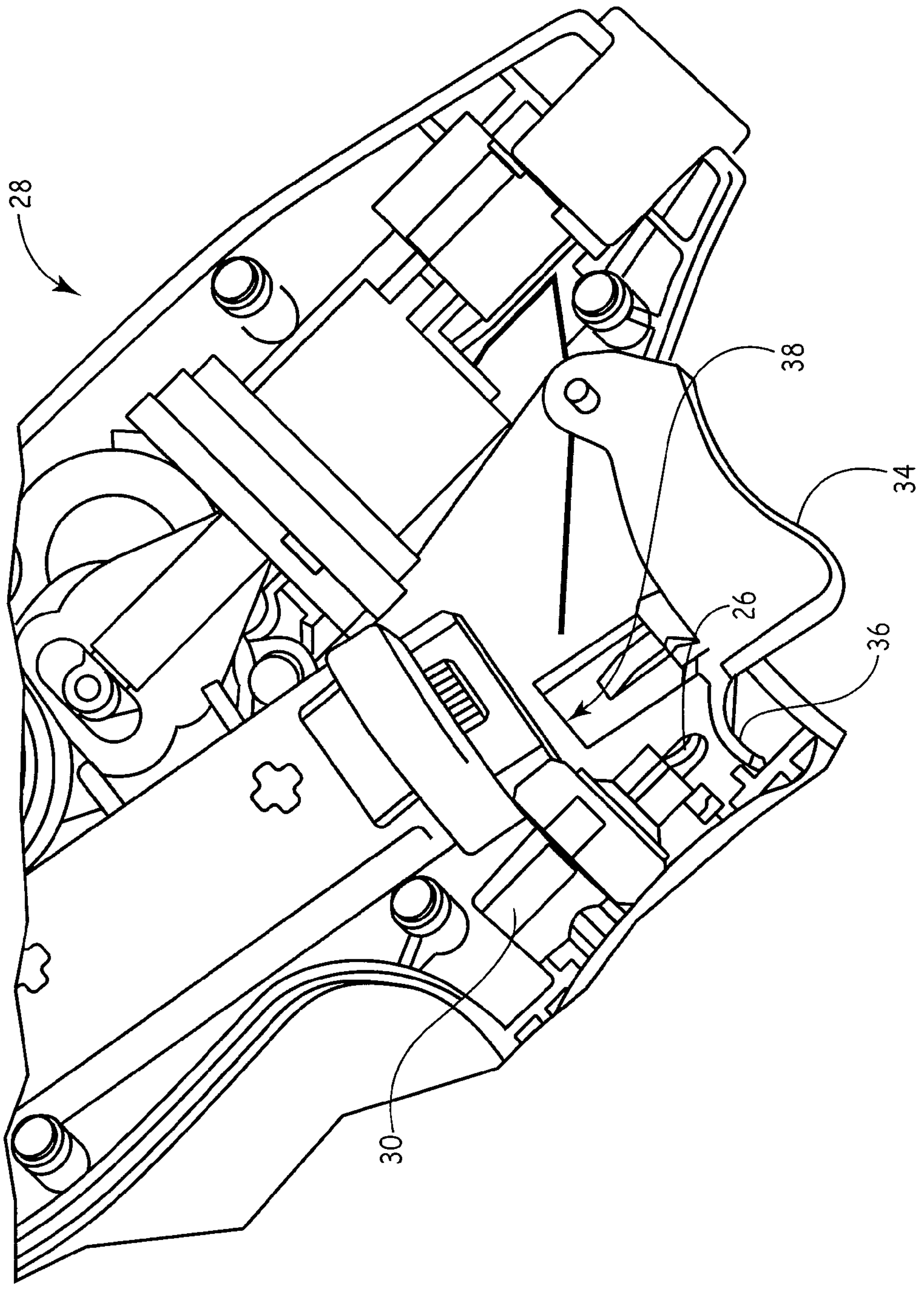
FIG. 3 is a partial side cross-sectional view of another embodiment of a handheld power sprayer having an air flow valve assembly in accordance with the present disclosure.

As illustrated in FIGS. 2 and 3, in some embodiments, an air return valve 30 may be used to allow air to return to a reservoir 32 of a dispensing device or system 28, such as, but not limited to, a sprayer. The air return valve 30 may be a one-way valve that allows air flow in one direction while preventing air flow or fluid flow in the opposite direction. For example, the air return valve 30 may only allow air flow towards and into the reservoir 32, but may not allow air flow out of the reservoir 32. The air return valve 30 may be directly or operably coupled to the reservoir 32. As such, air may flow through the air return valve 30 and into the reservoir 32.

In one embodiment, the air return valve 30 may allow air to flow into the reservoir 32 when the seal of the air return valve is released or open. The seal in the air return valve 30 may be released or opened by the vacuum pressure created in the reservoir 32 when fluid is pulled from, and out of, the reservoir 32. Thus, in one embodiment, the air return valve 30 may open and allow air to flow into the reservoir 32 during the removal of fluid from the reservoir 32 or shortly after removal of fluid from the reservoir 32. Particularly, the air return valve 30 may allow air to flow into the reservoir 32, upon, during, and/or shortly after actuation of the dispensing device 28 by, for example, a trigger 34.

In further embodiments, as discussed above, the push rod 26 of the air return valve 30 may be activated by the trigger 34. The trigger 34, as illustrated in FIG. 3, may have a tab, lever, contact point, or the like 36 that may abut and/or push on push rod 26 when the trigger 34 is activated. In alternative embodiments, the trigger 34 need not include tab 36, but may be shaped or configured in any other suitable manner such that the trigger 34 activates push rod 26. In yet further embodiments, the trigger may include another tab, lever, contact point, or the like 38 that, upon activation of the trigger 34, may abut and/or contact an isolated battery compartment, further discussed below, to complete an electrical circuit and activate a dispensing device 28. In alternative embodiments, the trigger 34 need not include tab 38, but may be shaped or configured in any other suitable manner such that the trigger 34 completes an electrical circuit to activate the dispensing device 28. In one embodiment, the tabs 36 and 38 are configured so that upon activation of the trigger 34, the tab 36 and tab 38 generally simultaneously, and respectively, activate the push rod 26 and the dispensing device 28.

Figure 4:
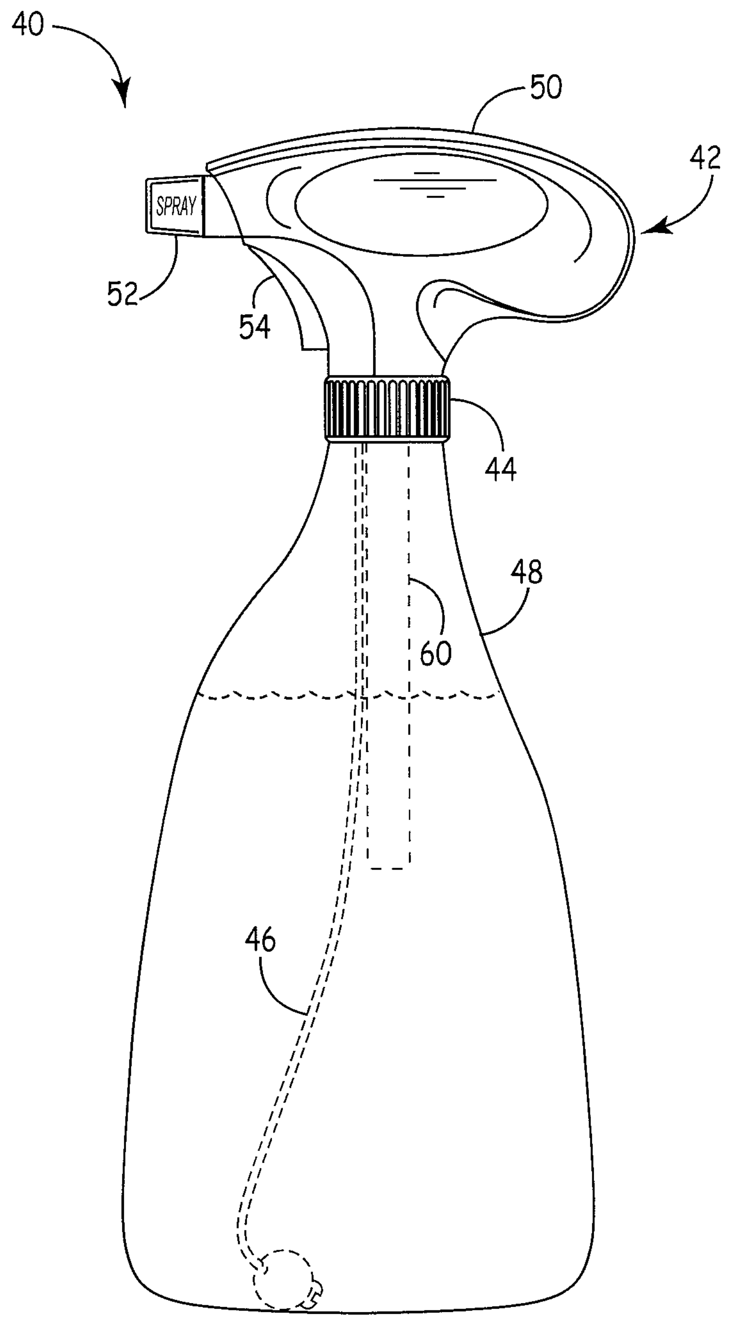
FIG. 4 is an elevation view of a power sprayer in accordance with the present disclosure mounted on a reservoir adapted to contain a fluid.
Figure 5:
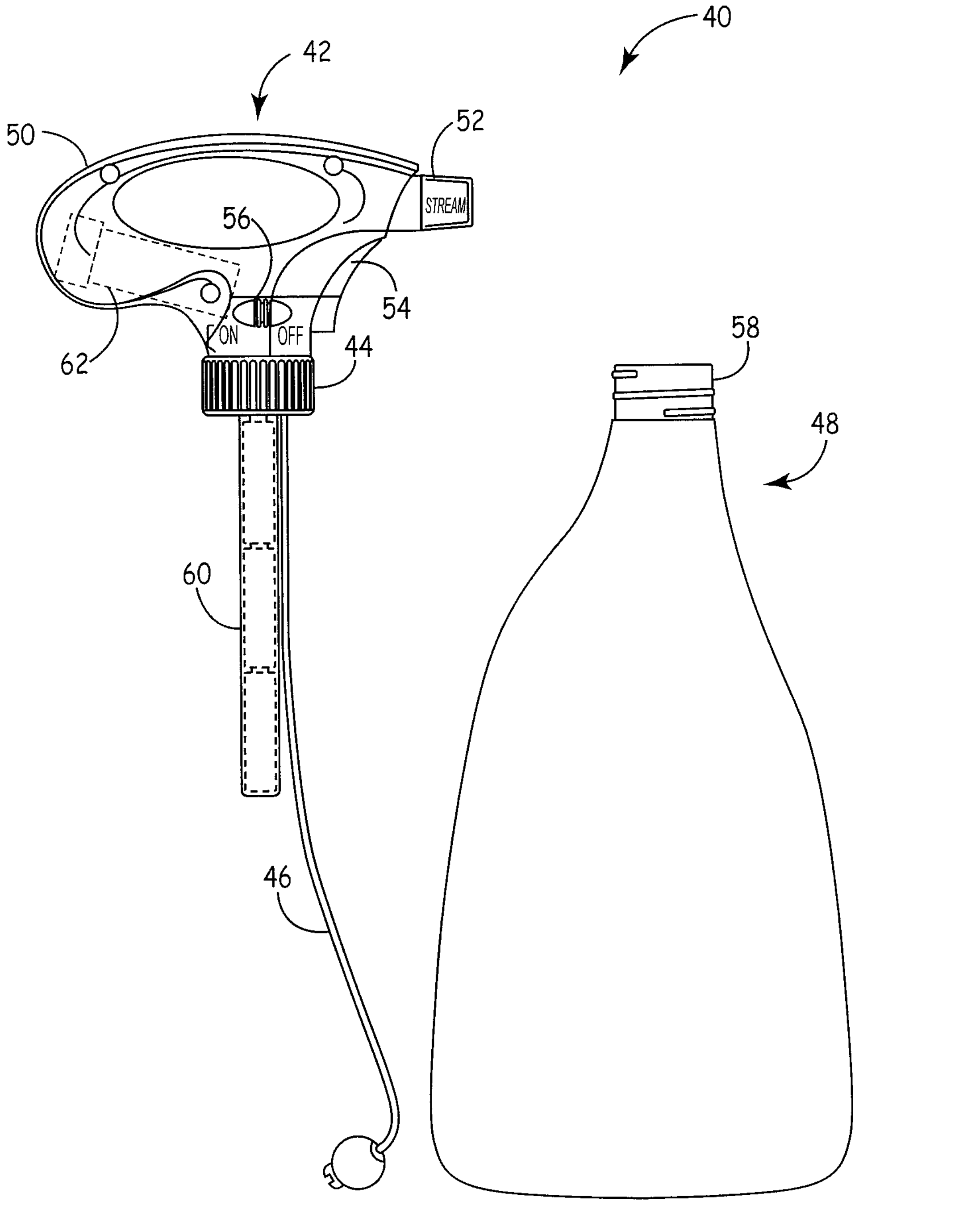
FIG. 5 is an elevation view of a power sprayer in accordance with the present disclosure and a reservoir adapted to contain a fluid, wherein the sprayer is not mounted on the reservoir.

A dispensing device of the present disclosure may include some or all of the components, features, and advantages of a power sprayer as disclosed in U.S. patent application Ser. No. 11/693,426, filed Mar. 29, 2007, entitled Power Sprayer, and published on Oct. 4, 2007 under U.S. Publication No. 2007/0228186, the entirety of which is hereby incorporated by reference herein. With reference to FIGS. 4 and 5, a dispensing device 40 may include a spray head 42, a cap 44, and a flexible intake tube 46. When the dispensing device 40 is mounted on a reservoir 48, the spray head 42 and cap 44 may be located outside the reservoir 48, while the flexible intake tube 46 may be located inside the reservoir 48. As further shown in FIGS. 4 and 5, the spray head 42 may include a housing 50, a nozzle cap 52, a trigger 54, and a safety lock 56. The cap 44 may connect the spray head 42 to the reservoir 48 via female threads adapted to mate with the male threads of the neck 58. The cap 44 may be adapted to be compatible with most reservoirs 48 used to hold common household, garage, and garden liquids. The trigger 54 is used to actuate the sprayer dispensing device 40. As indicated in FIGS. 4 and 5, in one embodiment, the dispensing device 40 may be actuated by partially displacing the trigger 54 into the housing 50. When the spray head 42 is mounted on a reservoir 48, a battery tube 60 may extend from the cap 44 down into the reservoir 48. In an alternate embodiment, as shown in FIG. 5, an isolated or separate battery compartment 62 may be contained within the sprayer housing 50, to the rear of the housing, and spaced away from and generally downwardly from the pump and motor. Those skilled in the art will readily understand that the dispensing device may include a reciprocating piston-type pump, dual reciprocating pump, a gear pump, a peristaltic pump, or other suitable pumping assembly without departing from the spirit and scope of the invention.

In a further embodiment, the spray head 42 may be operably coupled to, but remote from, separate, or not directly connected to the reservoir 48 of material to be dispensed. Similarly, it should be appreciated that any embodiment of the spray head 42 in accordance with the present invention could be disposable.

Although the present invention has been described with reference to preferred embodiments, persons skilled in the art will recognize that changes may be made in form and detail without departing from the spirit and scope of the invention. For example, although described in some embodiments with respect to a power sprayer, the air valve of the present disclosure is not limited to use with power sprayers and may be used in a variety of applications including, but not limited to, refining or chemical processing industries, coating systems or mechanisms, handheld sprayers, water guns or other toys, paint sprayers, or any other environment where relief of a vacuum pressure is desired, including the return of air into a container having a fluid, where dispensing the fluid creates a vacuum. Although illustrated as having a generally horizontal position, the air return valve may be oriented generally vertically, diagonally, or at any other suitable angle without departing from the spirit and scope of the present disclosure.

We claim:

1. A valve comprising:

a first and a second side;

a membrane for controlling a flow through the valve between the first and second sides, the membrane having open and closed positions;

an element urging the membrane to a closed position, wherein a vacuum pressure at one of the first or second sides overcomes the urging of the element, thereby moving the membrane to the open position; and an actuator for one of easing or initiating the movement of the membrane, wherein the membrane and at least part of the element is located in a flow path between an intake end and an exhaust end of the valve.

2. The valve of claim 1, wherein the valve is a one-way valve, allowing flow from one side to the other.

3. The valve of claim 2, wherein the vacuum pressure is operably coupled to the second side.

4. The valve of claim 3, wherein the first side comprises an air intake.

5. A valve assembly for relieving a vacuum pressure, the valve assembly comprising:

an air intake end and an air exhaust end, the exhaust end being operably connected to a source of the vacuum pressure;

a valve membrane for controlling air flow through the valve assembly between the intake end and the exhaust end;

a spring member providing a generally closed bias to the valve membrane that the vacuum pressure overcomes in order to open the valve membrane; and an actuator for initiating the opening of the valve membrane, wherein the valve membrane and at least part of the actuator is located in a flow path between the intake end and an exhaust end of the valve.

6. The valve assembly according to claim 5, wherein the actuator does not open the valve membrane enough to sufficiently allow air flow from the intake end to the exhaust end.

7. The valve assembly according to claim 5, wherein the valve membrane is a one-way valve.

8. The valve assembly according to claim 7, wherein the valve membrane is an umbrella-like valve membrane.

9. A method of relieving a vacuum pressure comprising:

providing a valve comprising an intake end, exhaust end, and a valve membrane forming a seal within the valve between the intake end and exhaust end;

operably connecting the exhaust end to the vacuum pressure; and initiating the opening of the valve with a mechanical actuator by breaking the seal of the valve membrane using the mechanical actuator;

wherein the vacuum pressure operably connected to the exhaust end causes the valve to open sufficiently to relieve the vacuum pressure, wherein at least part of the actuator is located in a flow path between the intake end and the exhaust end of the valve.

10. The method of claim 9, wherein the valve is a one-way valve.

11. The method according to claim 9, wherein the mechanical actuator does not open the valve sufficiently to allow air to pass from the intake end to the exhaust end.

12. The method according to claim 9, wherein the valve membrane closes and reforms a seal within the valve between the intake end and exhaust end when the vacuum pressure is substantially eliminated.

13. The valve according to Claim 1 wherein the element is directly connected to the membrane.

14. A valve comprising:

a first and a second side;

a membrane located between the first and second sides for controlling a flow through the valve between the first and second sides, the membrane having open and closed positions;

an element urging the membrane to a closed position, wherein a vacuum pressure at one of the first or second sides overcomes the urging of the element, thereby moving the membrane to the open position; and an actuator for one of easing or initiating the movement of the membrane, wherein at least part of the element is located in a flow path between an intake end and the exhaust end of the valve.

* * * * *